United States Patent
McCormack et al.

(10) Patent No.: US 10,963,510 B2
(45) Date of Patent: Mar. 30, 2021

(54) DYNAMIC NATURAL LANGUAGE PROCESSING TAGGING

(71) Applicant: BANK OF AMERICA CORPORATION, Charlotte, NC (US)

(72) Inventors: James McCormack, Charlotte, NC (US); Sean M. Gutman, Waxhaw, NC (US); Manu J. Kurian, Dallas, TX (US); Sasidhar Purushothaman, Hyderabad (IN); Suki Ramasamy, Chennai (IN); William P. Jacobson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 85 days.

(21) Appl. No.: 16/059,798

(22) Filed: Aug. 9, 2018

(65) Prior Publication Data
US 2020/0050702 A1 Feb. 13, 2020

(51) Int. Cl.
*G06F 16/68* (2019.01)
*G06F 40/30* (2020.01)
*G06F 16/683* (2019.01)

(52) U.S. Cl.
CPC .......... *G06F 16/686* (2019.01); *G06F 16/683* (2019.01); *G06F 40/30* (2020.01)

(58) Field of Classification Search
CPC ....... G06F 16/686; G06F 16/683; G06F 40/30
USPC .......................................................... 704/9
See application file for complete search history.

(56) References Cited

U.S. PATENT DOCUMENTS

| | | | |
|---|---|---|---|
| 5,625,748 A * | 4/1997 | McDonough | G10L 15/1822 704/236 |
| 8,023,751 B1 | 9/2011 | Reisman | |
| 8,688,448 B2 | 4/2014 | Peters et al. | |
| 9,082,403 B2 | 7/2015 | Ju et al. | |
| 9,633,004 B2 | 4/2017 | Giuli et al. | |
| 9,633,674 B2 | 4/2017 | Sinha | |
| 9,740,665 B2 | 8/2017 | Riskin et al. | |
| 9,875,736 B2 | 1/2018 | Kim et al. | |

(Continued)

OTHER PUBLICATIONS

Purushothaman, S. et al., "Dynamic Memory Allocation using Natural Language Processing Tags," U.S. Appl. No. 16/059,893, filed Aug. 9, 2018, 48 pages.

(Continued)

*Primary Examiner* — Paras D Shah
*Assistant Examiner* — Rodrigo A Chavez
(74) *Attorney, Agent, or Firm* — Michael A. Springs

(57) ABSTRACT

A natural language processing system that includes an artificial intelligence (AI) engine and a tagging engine. The AI engine is configured to receive a set of audio files and to identify concepts within the set of audio files. The AI engine is further configured to determine a usage frequency for each of the identified concepts and to generate an AI-defined tag for concepts with a usage frequency that is greater than a usage frequency threshold. The tagging engine is configured to receive an audio file and to identify observed concepts within the audio file. The tagging engine is further configured to compare the observed concepts to the first set of concepts, to determine one or more observed concepts matches concepts linked with AI-defined tags, and to modify metadata for the audio file to include AI-defined tags.

17 Claims, 6 Drawing Sheets

(56) References Cited

U.S. PATENT DOCUMENTS

| | | | | |
|---|---|---|---|---|
| 2009/0106022 | A1* | 4/2009 | Madani | G06F 40/274 |
| | | | | 704/232 |
| 2012/0089396 | A1* | 4/2012 | Patel | G10L 25/00 |
| | | | | 704/249 |
| 2013/0212109 | A1* | 8/2013 | Evancich | G06F 16/285 |
| | | | | 707/740 |
| 2014/0207776 | A1 | 7/2014 | Harris et al. | |
| 2015/0332168 | A1* | 11/2015 | Bhagwat | G06F 40/30 |
| | | | | 706/12 |
| 2017/0344617 | A1* | 11/2017 | Sen | G06F 16/313 |
| 2018/0048751 | A1 | 2/2018 | Crowell et al. | |
| 2018/0329993 | A1* | 11/2018 | Bedadala | G06F 40/58 |

OTHER PUBLICATIONS

Ramasamy, S. et al., "Resource Management Using Natural Language Processing Tags," U.S. Appl. No. 16/059,951, filed Aug. 9, 2018, 47 pages.

* cited by examiner

DYNAMIC NATURAL LANGUAGE PROCESSING TAGGING

TECHNICAL FIELD

The present disclosure relates generally to natural language audio processing, and more specifically to dynamically tagging audio samples using natural language processing.

BACKGROUND

Typically, audio files are large data files compared to other types of data files. In a computer system, storing a collection of audio files consumes a large amount of memory resources. This poses several technical challenges for computer systems because these systems have to constantly expand their data storage capabilities to provide sufficient storage capacity for new audio files. As a system's memory resources approach their maximum capacity, the number of memory resources for other operations performed by the system becomes reduced which begins to degrade the performance of the system.

Computer systems lack the capabilities to determine whether to store audio files or remove audio files from memory. Some systems may use a manual process which is performed by an operator to determine whether to store or remove an audio file. However, audio files are typically several minutes in length. This means that for each audio file, the operator may have to listen to several minutes of audio to determine whether to store or remove an audio file. This process is time intensive and causes a bottleneck that limits the speed that the system can accept audio files and its ability to manage its memory resources.

SUMMARY

Typically, audio files are large data files compared to other types of data files. In a computer system, storing a collection of audio files consumes a large amount of memory resources. This poses several technical challenges for computer systems because these systems have to constantly expand their data storage capabilities to provide sufficient storage capacity for new audio files. As a system's memory resources approach their maximum capacity, the number of memory resources for other operations performed by the system becomes reduced which begins to degrade the performance of the system. Computer systems lack the capabilities to determine whether to store audio files or remove audio files from memory. Some systems may use a manual process which is performed by an operator to determine whether to store or remove an audio file. However, audio files are typically several minutes in length. This means that for each audio file, the operator may have to listen to several minutes of audio to determine whether to store or remove an audio file. This process is time intensive and causes a bottleneck that limits the speed that the system can accept audio files and its ability to manage its memory resources.

The natural language processing system described in the present application employs natural language processing that allows a computer system to 1) dynamically tag audio files based on their content, 2) generate new tags based on concepts observed within a set of audio files, 3) selectively store or remove audio files based on the tags associated with the audio files, 4) periodically purge tags from memory that are not being frequently used, and 5) select a data storage device or location for an audio file based on the tags associated with the audio file.

The natural language processing system provides a technical advantage by dynamically tagging audio files based on the content of the audio files. The natural language processing system tags audio files using a combination of user-defined tags, artificial intelligence (AI)-defined tags, context tags, and any other suitable type of tags. The natural language processing system uses user-defined tags to indicate that an audio file contains concepts that a user has previously identified. The natural language processing system uses AI-defined tags to indicate that an audio file contains concepts that the natural language processing system has observed frequently in audio files. AI-tags tags provide a technical advantage because they are dynamically generated based on the content of audio files that the natural language processing system has previously accessed. This feature allows the natural language processing system to learn and identify new concepts for tagging that may not have been previously identified by a user in the user-defined tags. The natural language processing system uses context tags to identify non-verbal audio information that is present in an audio file. For example, context tags may be used to identify background noise, crowd noise, traffic noise, speech rate, speech volume, or any other suitable type of non-verbal information about the audio file. The natural language processing system is configured to analyze the content of an audio file and to modify the metadata of the audio file to include tags based on the observed content from the audio file.

The natural language processing system is configured to use the tags associated with an audio file to selectively store or remove the audio file. In one embodiment, the natural language processing system may use tags linked with an audio file to determine a priority level or an activity level for the audio file. The natural language processing system may use this information for determining whether to delete the audio file or to store the audio file. For example, the natural language processing system may determine and associate a priority level with an audio file based on the tags associated with the audio file. The priority level is a value that indicates a level of priority or importance associated with an audio file. For example, an audio file with a relatively large numeric value may indicate that an audio file has a high priority or is urgent. For instance, an audio file that includes information related to a system outage or an emergency may have a high priority level. An audio file with a smaller numeric value may indicate that an audio file has a low priority or is not urgent. For instance, an audio file that includes a generic conversation may have a low priority level. The natural language processing system may determine whether to store the audio file into memory based on the priority level. In one embodiment, the natural language processing system may delete audio files with a priority level that is less than a priority level threshold value. In this configuration, the natural language processing system is configured to efficiently manage resources by selectively storing and removing audio files based on the priority of an audio file. For example, audio files that are more urgent and have a higher priority may be stored while audio files that are not as critical may be deleted from memory.

In one embodiment, the natural language processing system is configured to periodically determine how often tags are being used and to remove tags that are not being used frequently. This configuration provides a technological improvement that allows the natural language processing system to dynamically reduce file sizes and free up memory resources by removing tags from memory that are not being frequently used.

In one embodiment, the natural language processing system is further configured to route an audio file to a particular data storage device or location based on tags or information determined about the audio file. In this configuration, the natural language processing system may select a data storage device for an audio file based on data access speed, security features, or any other features that may be necessary for the audio file. This process provides a technological improvement by allowing the natural language processing system to efficiently manage its data storage resources and to optimize the location where audio files are stored.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The natural language processing system disclosed herein employs natural language processing that enables a computer system to 1) dynamically tag audio files based on their content, 2) generate new tags based on concepts observed within a set of audio files, 3) selectively store or remove audio files based on the tags associated with the audio files, 4) periodically purge tags from audio file or memory that are not being frequently used, and 5) select a data storage device or location for an audio file based on the tags associated with the audio file.

Figure 1:
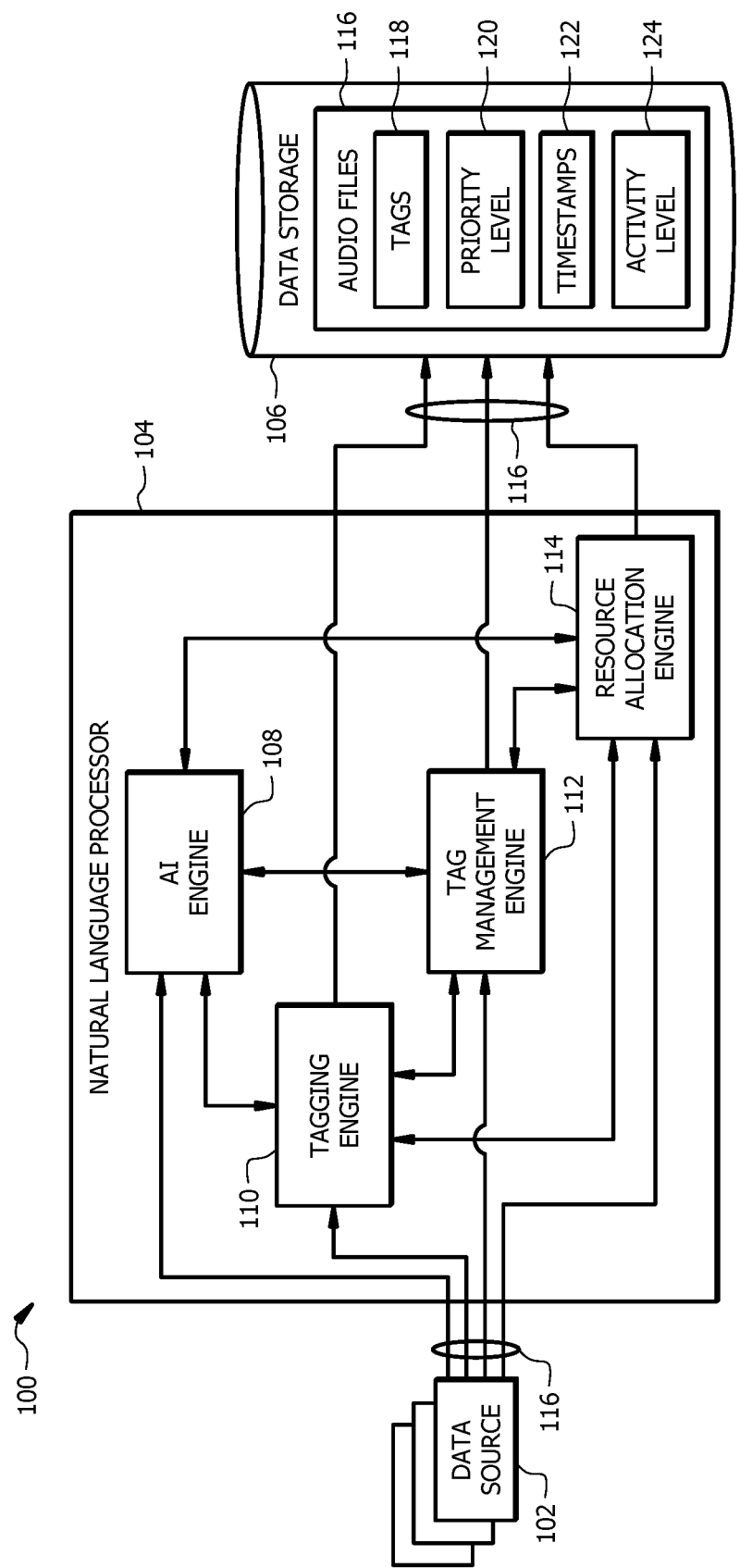
FIG. 1 is a schematic diagram of an embodiment of a natural language processing system.
Figure 2:
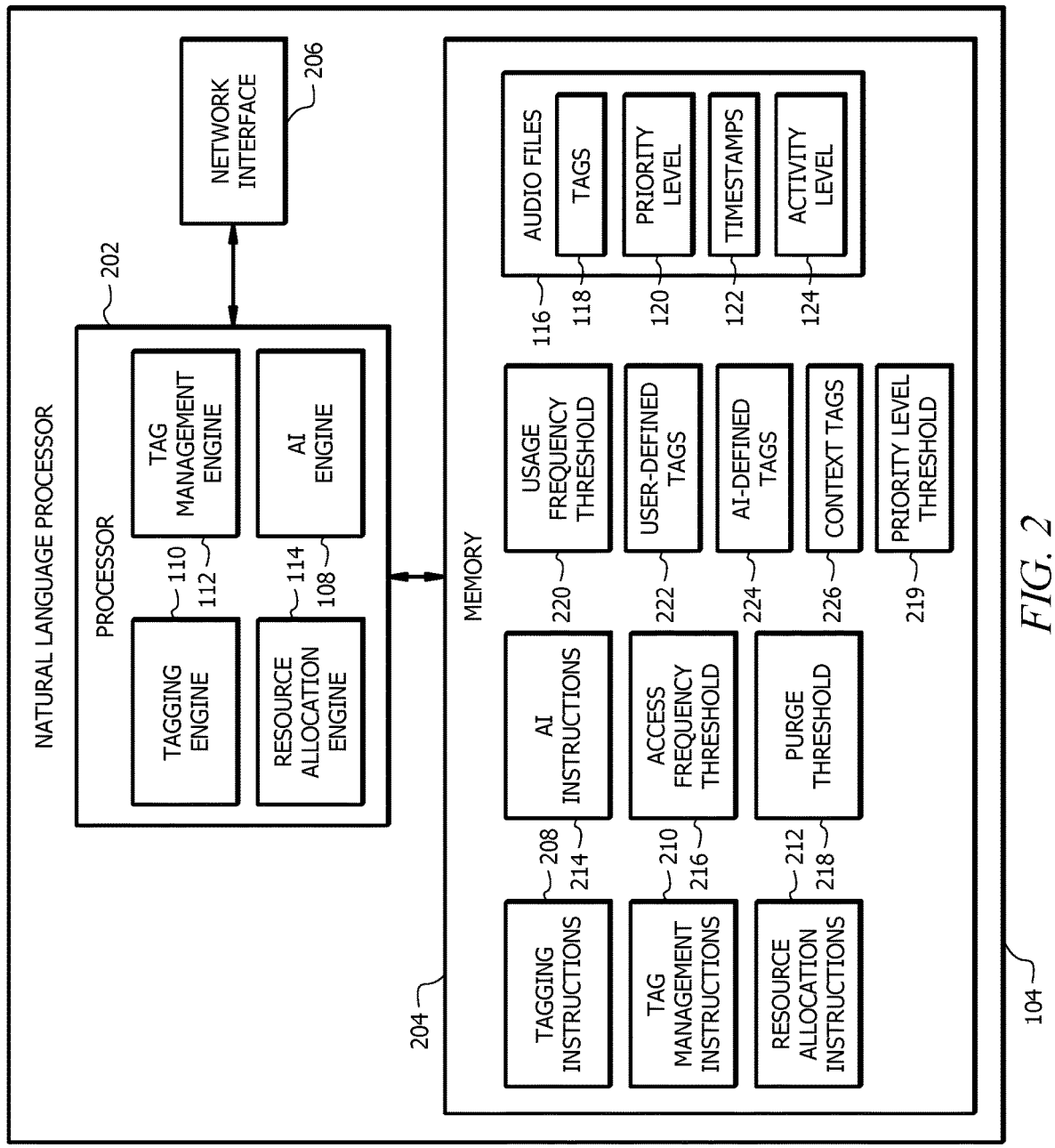
FIG. 2 is a schematic diagram of an embodiment of a natural language processor for a natural language processing system.
Figure 3:
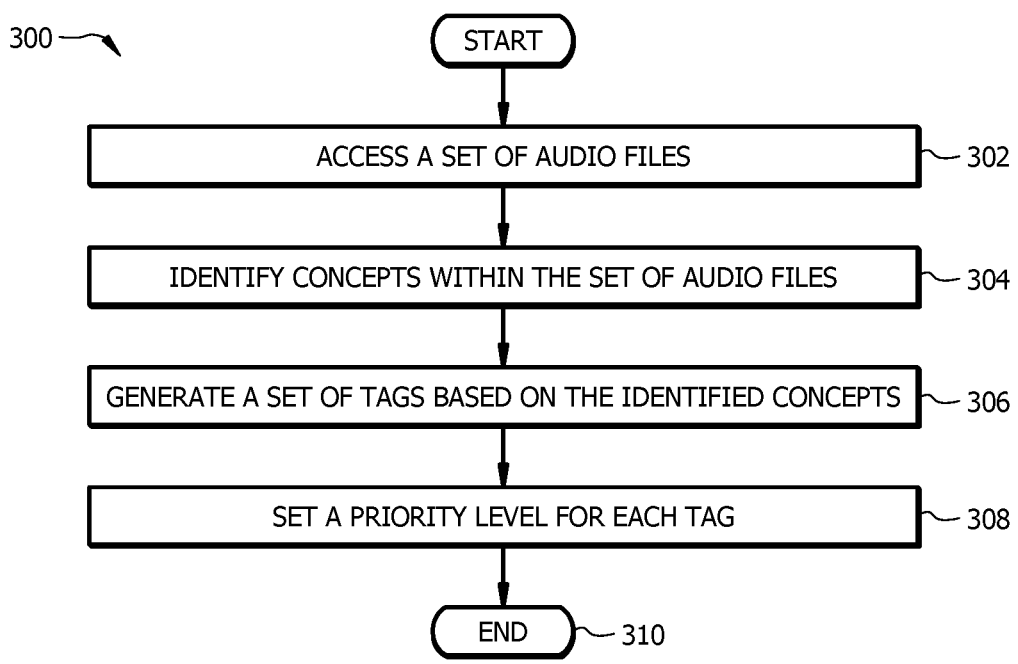
FIG. 3 is a flowchart of an embodiment of an artificial intelligence tagging method for the natural language processing system.
Figure 4:
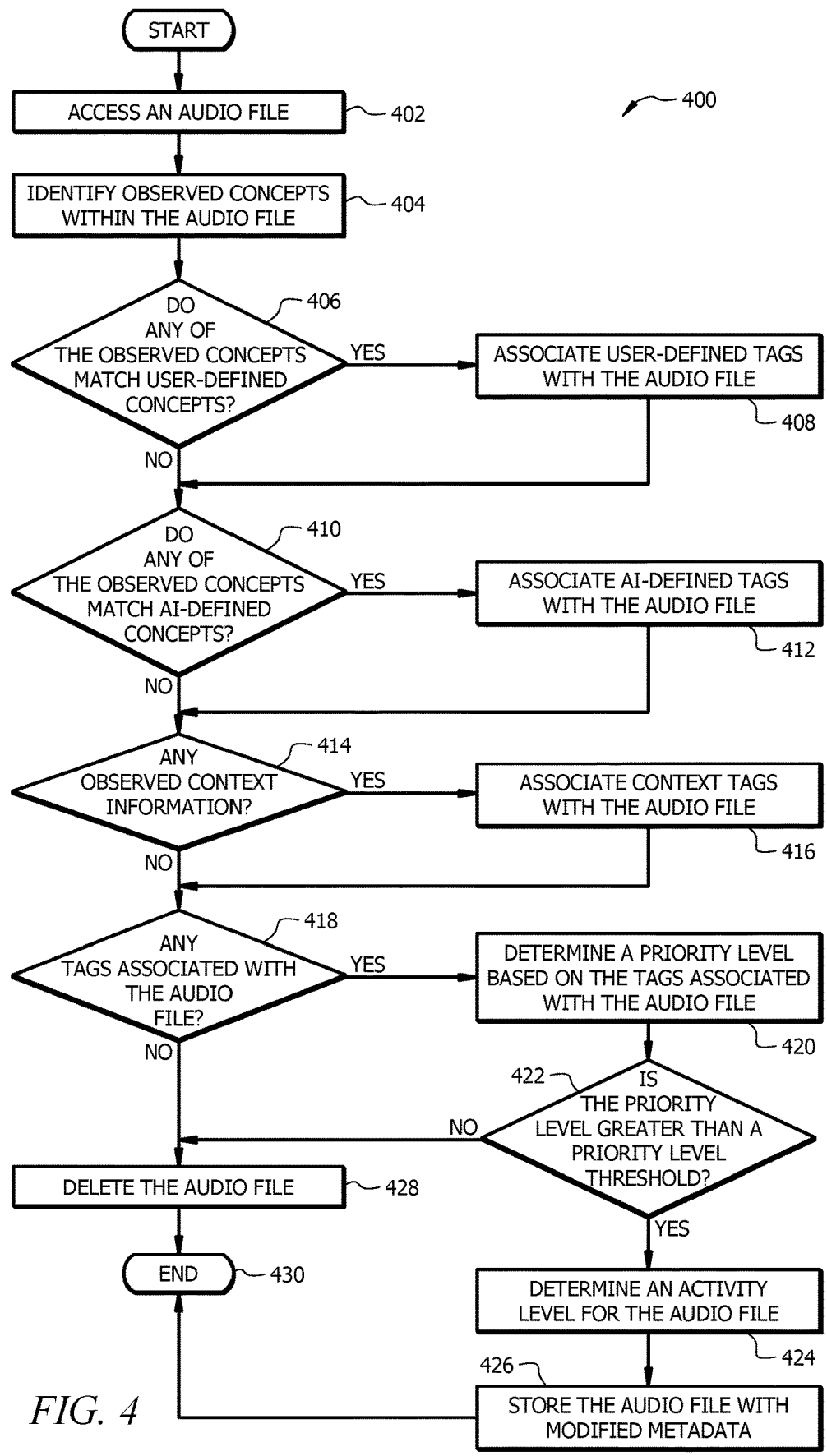
FIG. 4 is a flowchart of an embodiment of an audio sample tagging method for the natural language processing system.
Figure 5:
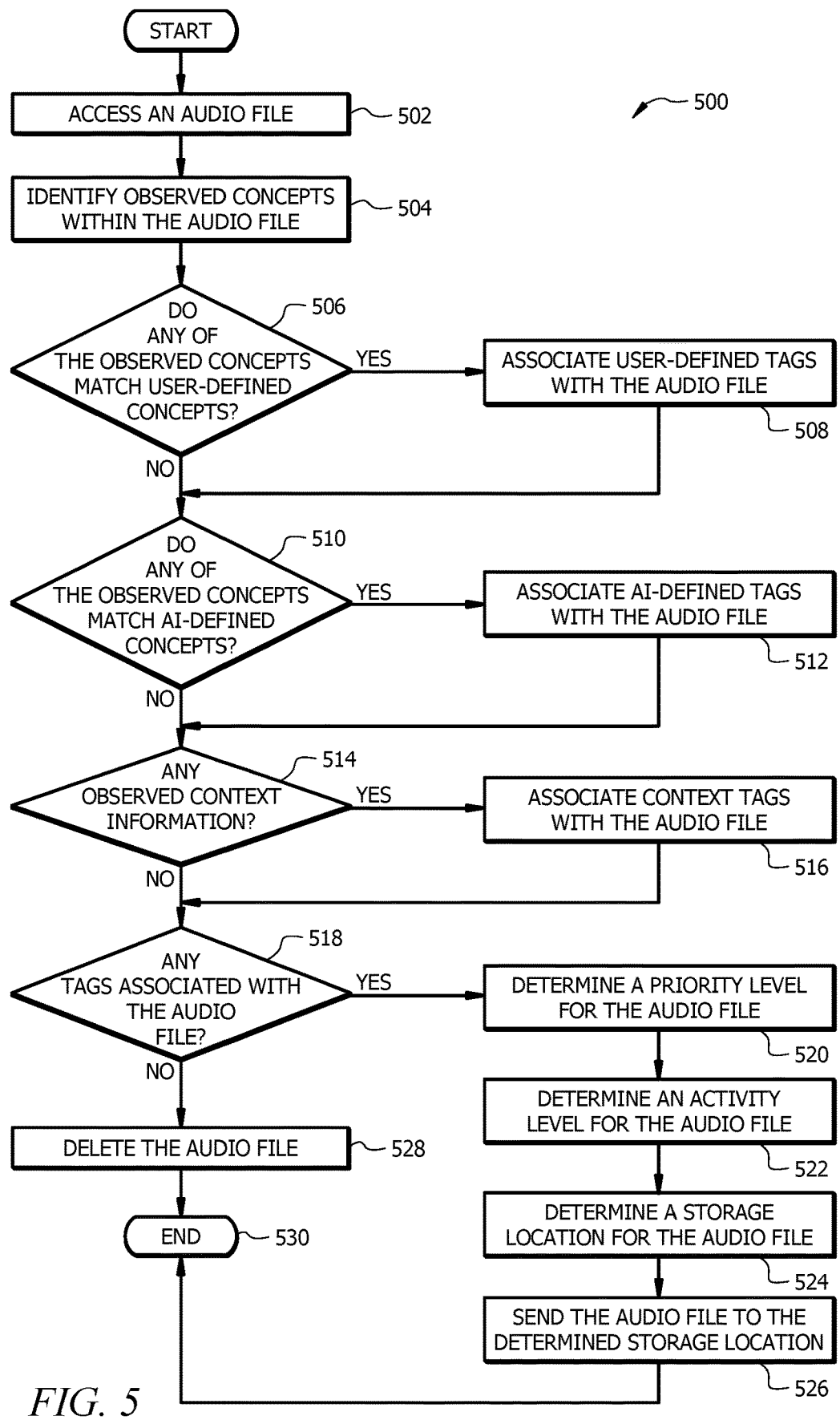
FIG. 5 is a flowchart of an embodiment of a selective audio sample storing method for the natural language processing system.
Figure 6:
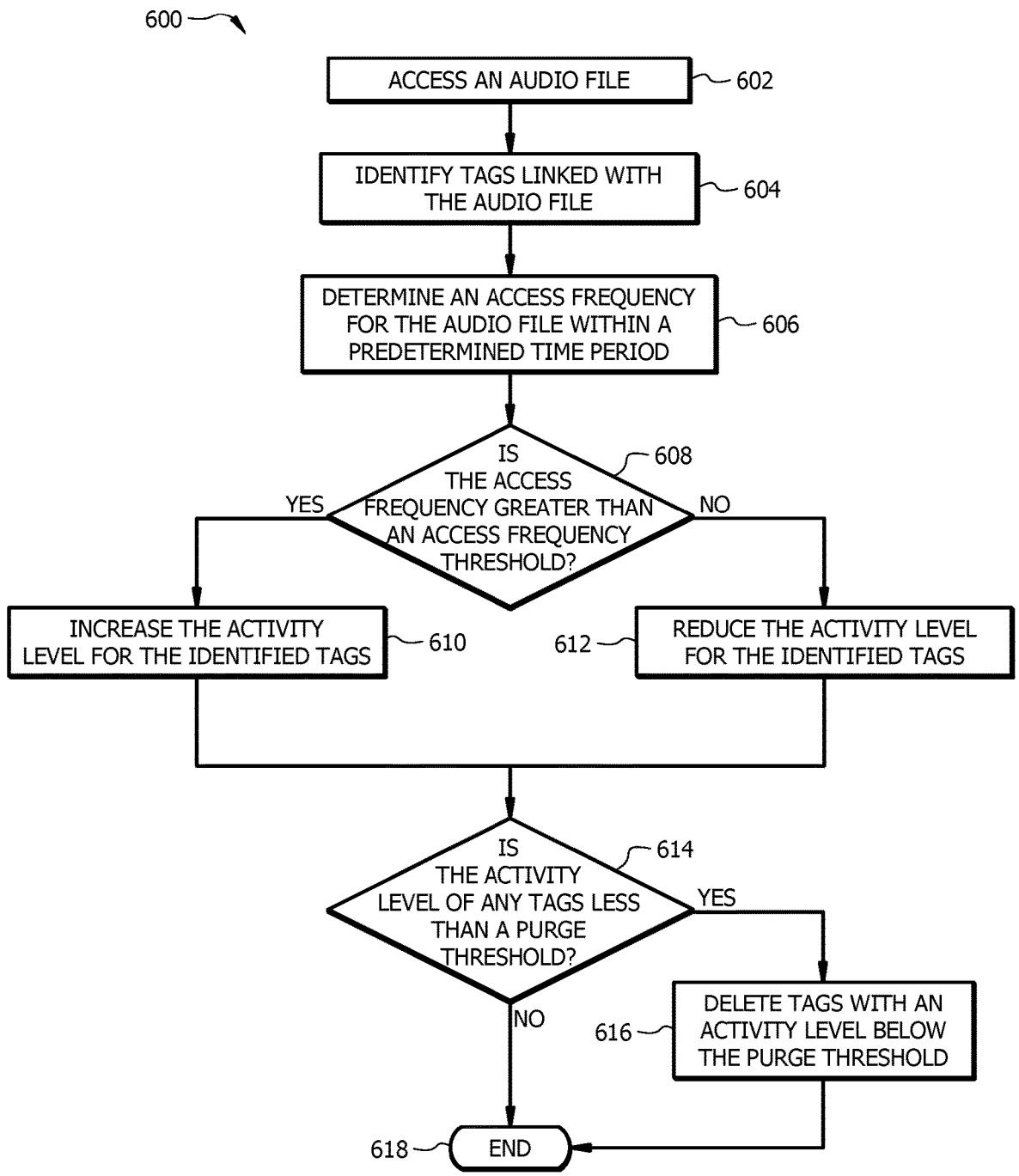
FIG. 6 is a flowchart of an embodiment of a tag management method for the natural language processing system.

FIGS. 1 and 2 are embodiments of a natural language processing system and device, respectively, that are configured to provide the technical features described above. FIG. 3 is an embodiment of a process implemented by the natural language processing system for generating new tags based on concepts observed within a set of audio files. FIG. 4 is an embodiment of a process implemented by the natural language processing system for dynamically tagging audio files based on their content and selectively storing audio files based on their tags. FIG. 5 is an embodiment of a process implemented by the natural language processing system for selecting a data storage device or location based on tags associated with an audio file. FIG. 6 is an embodiment of a process implemented by the natural language processing system for periodically purging tags that are not being frequently used.

FIG. 1 is a schematic diagram of an embodiment of a natural language processing system 100. The natural language processing system 100 comprises one or more data sources 102, a natural language processor 104, and one or more data storage devices 106. The natural language processing system 100 is generally configured to receive audio files 116 from the data sources 102, to tag the audio files 116 based on the content of the audio files 116, and to selectively store the audio file 116 in a data storage device 106. This configuration provides a technical improvement that enables a computer network to tag an audio file 116 based on the content of the audio file 116 and to determine whether to handle the audio file 116 to efficiently utilize available hardware resources. For example, the natural language processing system 100 may be implemented by a computer network to analyze the content of a set of audio files 116 and to determine whether to delete the audio file 116, to store the audio file 116, or to route the audio file 116 to a particular data storage device 106 or location based on the tags associated with the audio file 116. This configuration provides a technical advantage that dynamically processes audio files 116 which allows the computer network to efficiently manage its hardware resources (e.g. memory) while increasing the throughput and performance of the system.

Examples of data sources 102 include, but are not limited to, the Internet, social media, databases, memories, servers, computing devices, or any other suitable type of device. The natural language processing system 100 may comprise any suitable number of data sources 102 in signal communication with the natural language processor 104. Data sources 102 may be in signal communication with the natural language processor 104 using any suitable type of wired or wireless connection and/or communication protocol. Each data source 102 is configured to send audio files 116, text files, images, and/or any other type of data to the natural language processor 104. In one embodiment, a data source 102 is configured to periodically send data (e.g. audio files 116) to the natural language processor 104. For example, a data source 102 may be configured to send data to the natural language processor 104 in real-time or at predetermined time intervals (e.g. hourly or daily). In another embodiment, a data source 102 is configured to send data in response to a data request from the natural language processor 104.

Examples of data storage devices 106 include, but are not limited to, databases, memories, hard drives, flash drives, servers, cloud servers, computing devices, or any other suitable type of data storing device. The natural language processing system 100 may comprise any suitable number of data storage devices 106 in signal communication with the natural language processor 104. Data storage devices 106 may be in signal communication with the natural language processor 104 using any suitable type of wired or wireless connection and/or communication protocol. Each data storage device 106 is configured to receive audio files 116, tags 118, priority levels 120, timestamps 122, activity levels 124, text files, images, and/or any other type of data from the natural language processor 104.

Audio files 116 may be any suitable type of audio files. Examples of audio file formats include, but are not limited to, wav files, wma files, mp3 files, aiff files, or any other suitable audio file format. Audio files 116 comprise a combination of verbal (e.g. speech) and non-verbal (e.g. background noise or speech characteristics) information. In one embodiment, the data storage device 106 may be configured to store text representations of the audio file 116. For example, the text representation may be result of a speech-to-text translation performed by the natural language processor 104.

In one embodiment, the tags 118 are metadata tags. In other embodiments, the tags 118 may be any other suitable type of tag as would be appreciated by one of ordinary skill in the art. The tags 118 may comprise user-defined tags, AI-defined tags, context tags, and/or any other suitable type of tags 118. The user-defined tags comprise tags that are linked with concepts defined or specified by a user. In one embodiment, user-defined tags may be defined based on a set of dictionary terms or business rules. An operator may provide a predetermined set of user-defined tags for the natural language processor 104 to use for identifying concepts that are present within audio files 116. Concepts are any type of descriptor or identifier that identifies verbal or non-verbal information that may be present within an audio file 116. Examples of concepts include, but are not limited to, news, errors, online services, customer service, locations, people, technology, law, medicine, or any other type of concept. Each user-defined tag may be linked with one or more concepts. The AI-defined tags are tags 118 that are generated by the AI engine 108 based on analyzing the content of audio files 116 to identify concepts present in the audio file 116. For example, the AI engine 108 may process and analyze a set of audio files 116 to generate tags 118 identifying new concepts that were observed from analyzing the audio files 116. Each AI-defined tag may be linked with one or more concepts. The context tags may comprise tags 118 linked with context information that is provided by a user or generated by the AI engine 108. Context tags and context information identify non-verbal audio information that is present within an audio file 116. Examples of non-verbal audio information include, but are not limited to, background noise, crowd noise, traffic noise, speech rate, speech volume, or any other suitable type of non-verbal information.

A priority level 120 is a value that indicates a level of priority or importance associated with an audio file 116. For example, an audio file 116 with a priority level set to a relatively large numeric value (or vice versa) may indicate that an audio file 116 has a high priority or is urgent. For instance, an audio file 116 that comprises information related to a system outage or an emergency may have a high priority level. An audio file 116 with a priority level set to a smaller numeric value (or vice versa) may indicate that an audio file 116 has a low priority or is not urgent. For instance, an audio file 116 that comprises a generic conversation may have a low priority level.

An activity level 124 is a value that indicates how often an audio file 116 has been accessed or used. For example, an audio file 116 with a high activity level 124 may indicate that the audio file 116 has been accessed frequently. An audio file 116 with a lower activity level 124 may indicate that the audio file 116 is not used as often. The activity level 124 may be used as a metric to indicate how important an audio file 116 is based on how frequently the audio file 116 is accessed.

Timestamps 122 comprise information about when an audio file 116 has been accessed. For example, a time stamp 122 may comprise a date and time that the audio file 122 was opened or played. Timestamps 122 may be in any suitable format as would be appreciated by one of ordinary skill in the art. In one embodiment, timestamps 122 may be stored as metadata linked with audio files 116.

The natural language processor 104 comprises an artificial intelligence (AI) engine 108, a tagging engine 110, a tag management engine 112, and a resource allocation engine 114. In one embodiment, the AI-engine 108, the tagging engine 110, the tag management engine 110, and/or the resource allocation engine 114 may be configured to perform natural language processing operations on data (e.g. audio files 116 or text files). Natural language processing operations include, but are not limited to, operations such as speech recognition, speech parsing or segmentation, identifying parts of speech, translating text-to-speech, translating speech-to-text, topic segmentation and recognition, sentiment analysis, optical character recognition, or any other suitable type of operations. In another embodiment, natural language processing operations may be performed by hardware and/or software external from the AI-engine 108, the tagging engine 110, the tag management engine 110, and/or the resource allocation engine 114. For example, the natural language processor 104 may further comprise a dedicated natural language processing engine for processing data.

Dynamic Tag Generation

The AI engine 108 is configured to receive or access audio files 116 from a data sources 102, to process the audio file 116 to identify concepts within the audio file 116, and to link AI-defined tags with the identified concepts. In one embodiment, AI-defined tags are metadata tags that can be linked with the audio file 116 to identify concepts that are present in the audio file 116. For example, an audio file 116 may include a conversation about a system error. The AI-engine 108 may associate tags 118 such as "system error," "system fault," or any other suitable type of tags 118. The generated AI-defined tags may be used by the natural language processor 104 for tagging concepts that are present within audio files 116 and processing audio files 116.

The AI engine 108 is configured to generate AI-tags based on the frequency that a concept appears or is used within one or more audio files 116. For example, the AI engine 108 may count the number of times a concept occurs within an audio file 116 or a set of audio files 116 and generate AI-defined tags 118 when the number of times the concepts occurs exceeds a usage frequency threshold value. In this configuration, the AI engine 108 provides a technological improvement by listening to audio files 116 to identify new concepts that frequently occur within one or more audio files 116. This allows the natural language processor 104 to learn and identify new concepts for tagging that may not have been previously identified by a user.

Dynamic Audio File Tagging and Storing

The tagging engine 110 is configured to receive or access audio files 116 from a data source 102, to process the audio file 116 to identify concepts that are present in the audio file 116, to determine whether any of the identified concepts match concepts within a set of previously defined concepts, and to link the audio file 116 with tags 118 when the identified concepts match concepts from the set of previously defined concepts. The tagging engine 110 may link the audio file 116 with user-defined tags, AI-defined tags, context tags, or any other suitable types of tags 118. In one embodiment, linking tags 118 with an audio file 116 comprises modifying the metadata of the audio file 116 to include the tags 118. In other embodiments, the tagging engine 110 may link tags 118 with an audio file 116 using any other suitable technique as would be appreciated by one of ordinary skill in the art.

The tagging engine 110 is configured to determine a priority level 120 for an audio file 116 based on tags 118 (e.g. AI-defined tags) associated with the audio file 116 and to store an audio file 116 based on a priority level 120 associated with the audio file 116. A priority level 120 is a value that indicates a level of priority or importance associated with an audio file 116. For example, an audio file 116 with a priority level 120 set to a large numeric value (or vice versa) may indicate that an audio file 116 has a high priority or is urgent. For instance, an audio file 116 that comprises information related to a system outage or an emergency may have a high priority level 120. An audio file 116 with a priority level 120 set to a smaller numeric value (or vice versa) may indicate that an audio file 116 has a low priority or is not urgent. For instance, an audio file 116 that comprises a generic conversation may have a low priority level 120. The tagging engine 110 may determine to store the audio file 116 into memory when the priority level 120 associated with the audio file 116 exceeds a priority level threshold value. In one embodiment, the tagging engine 110 may be configured to delete an audio file 116 when the priority level 120 associated with the audio file 116 is less than a priority level threshold value. In this example, the tagging engine 110 allows the natural language processing system 100 to conserve memory by removing audio files 116 that are a low priority or that may not be important to the natural language processing system 100. In one embodiment, the tagging engine 110 may be configured to modify the metadata of an audio file 116 to include the priority level 120 associated with the audio file 116.

The tagging engine 110 is configured to use the priority level 120 of the audio file 116 to determine an activity level 124 for an audio file 116 or tags 118 linked with an audio file 116. The activity level 124 is a value that indicates how often an audio file 116 has been accessed or used. For example, an audio file 116 with a high activity level 124 may indicate that the audio file 116 has been accessed frequently. An audio file 116 with a lower activity level 124 may indicate that the audio file 116 is not used as often. The activity level 124 may be used as a metric to indicate how important or useful an audio file 116 is based on how frequently the audio file 116 is accessed. The tagging engine 110 may be further configured to modify the metadata for the audio file 116 to include the determined activity level 124. In one embodiment, the activity level 124 is an adjustable value that increases or decays over time. The activity level 124 may be incremented or increased when an audio file 116 is accessed within a predetermined time period. The activity level 124 may be decremented or decreased when the audio file 116 has not been accessed within a predetermined time period. In this configuration, the activity level 124 is a dynamic value that can be used as a metric to indicate how often an audio file 116 is being accessed or used over time. The activity level 124 of an audio file 116 or tags 118 can be used by the natural language processing system 100 for determining which audio files 116 and tags 118 to purge to conserve memory resources.

Tag Usage Management

The tag management engine 112 is configured to receive or access audio files 116 from data sources 102, to process the audio files 116 to identify tags 118 associated with the audio file 116, to determine an access frequency for the audio file 116, and to adjust an activity level 124 for tags 118 associated with the audio file 116 based on the access frequency. The access frequency indicates how often the audio file 116 has been accessed within a predetermined time period. For example, the tag management engine 112 may be configured to determine the access frequency based on a determined number of access timestamps 122 within a predetermined time period. In one embodiment, the tag management engine 112 may be configured to increase the activity level 124 for tags 118 when the access frequency is greater than an access frequency threshold value. The tag management engine 112 may be configured to decrease the activity level 124 for tags 118 when the access frequency is less than an access frequency threshold value. In one embodiment, the tag management engine 112 is configured to reduce the priority level 120 associated with an audio file 116 in response to reducing the activity level 124 for tags 118 associated with the audio file 116.

The tag management engine 112 is configured to remove tags 118 from the audio file 116 and/or from a set of stored tags 118 when the tags 118 are not being used very often. For example, the tag management engine 112 may be configured to determine whether any tags 118 have an activity level 124 below a purge threshold value and remove tags 118 from the audio file 116 when their activity level 124 is less than the purge threshold value. This configuration allows the tag management engine 112 to dynamically reduce file sizes and free up memory resources by removing tags 118 that are not being frequently used from memory.

The tag management engine 112 is configured to check whether an audio file 116 is still linked with any tags 118 after removing tags 118 with an activity level 124 below the purge threshold value. The tag management engine 112 may remove audio files 116 that are no longer associated with any tags 118.

Selective Data Storing Based on Tags

The resource allocation engine 114 is configured to receive or access an audio file 116 from data sources 102, to process the audio file 116 to identify concepts within the audio file 116, to determine whether any of the identified concepts match concepts within a set of previously defined concepts, and to link the audio file 116 with the tags 118 when the identified concepts match concepts from the set of previously defined concepts. The resource allocation engine 114 may link the audio file 116 with user-defined tags, AI-defined tags, context tags, or any other suitable type of tags 118. In one embodiment, linking tags 118 with an audio file 116 comprises modifying the metadata for the audio file 116 to include the tags 118. In other embodiments, the resource allocation engine 114 may link tags 118 with an audio file 116 using the tagging engine 110 or any other suitable technique as would be appreciated by one of ordinary skill in the art.

The resource allocation engine 114 is further configured to identify a storage location (e.g. a storage device 106) from among the plurality of data storage devices 106 based on the tags 118 associated with the audio file 116 and to send the audio file 116 to the identified storage device 106.

The resource allocation engine 114 may be configured to determine a data access speed for the audio file 116 based on the tags 118 associated with the audio file 116 and to determine or select a storage location for the audio file 116 based on the determined data access speed. As an example, an audio file 116 that is associated with a fast data access speed may be sent to a storage device 106 that allows fast access such as a flash memory drive. As another example, an audio file 116 that is associated with a slow data access speed may be sent to a storage device 106 with a slower data access speed such as a tape drive. This process allows the resource allocation engine 114 to more efficiently manage the utilization of storage devices 106 for storing audio files 116. Slower storage devices 106 may provide a cost savings at the expense of data access speeds. Conversely, faster storage devices 106 may provide higher data access speed but may also be more expensive.

The resource allocation engine 114 may be configured to determine a priority level 120 for an audio file 116 based on the tags 118 associated with the audio file 116 and to determine or select a storage location for the audio file 116 based on the determined priority level 120. As an example, an audio file 116 that is associated with a high priority level 120 may be sent to a storage device 106 that allows fast access, enhanced security, and/or any other features for high priority audio files 116. As another example, an audio file 116 that is associated with a lower priority may be sent to a storage device 106 with slower data access speed, basic security, and/or any other features for low priority audio files 116. This process allows the resource allocation engine 114 to more efficiently manage the utilization of storage devices 106 for storing audio files 116. Storage devices 106 with varying levels of data access speed, security, and features can be dynamically selected for audio files 116 based on their priority level 120.

The resource allocation engine 114 is configured to determine an activity level 124 for an audio file 116 based on the priority level 120 of the audio file 116. The resource allocation engine 114 may be further configured to modify the metadata for the audio file 116 to include the determined priority level 120 and/or activity level 124. In other embodiments, the resource allocation engine 114 may determine and use any other information associated with an audio file 116 for selecting a storage location for the audio file 116.

Additional information about the natural language processor 104, the AI engine 108, the tagging engine 110, the tag management engine 110, and the resource allocation engine 114 is described in FIG. 2.

FIG. 2 is a schematic diagram of an embodiment of a natural language processor 104. The natural language processor 104 comprises a processor 202, a memory 204, and a network interface 206. The natural language processor 104 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the AI engine 108, the tagging engine 110, the tag management engine 112, and the resource allocation engine 114. In this way, processor 202 may be a special purpose computer designed to implement function disclosed herein. In an embodiment, the AI engine 108, the tagging engine 110, the tag management engine 112, and the resource allocation engine 114 are each implemented using logic units, FPGAs, ASICs, DSPs, or any other suitable hardware.

The AI engine 108, the tagging engine 110, the tag management engine 112, and the resource management engine 114 are configured similar to the AI-engine 108, the tagging engine 110, the tag management engine 112, and the resource management engine 114 described in FIG. 1, respectively. An example of the AI engine 308 in operation is described in FIG. 3. An example of the tagging engine 110 in operation is described in FIG. 4. An example of the tag management engine 112 in operation is described in FIG. 6. An example of the resource allocation engine 114 in operation is described in FIG. 5.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store tagging instructions 208, tag management instructions 210, resource allocation instructions 212, AI instructions 214, access frequency thresholds 216, purge thresholds 218, priority level thresholds 219, usage frequency thresholds 220, user-defined tags 222, AI-defined tags 224, context tags 226, and audio files 116, and/or any other data or instructions. The tagging instructions 208, the tag management instructions 210, the resource allocation instructions 212, and the AI instructions 214 may comprise any suitable set of instructions, logic, rules, or code operable to execute the tagging engine 110, the tag management engine 112, the resource allocation engine 114, and the AI engine 108, respectively.

The access frequency thresholds 216 are predefined values that are used for adjusting a priority level 120 associated with an audio file 116. For example, the natural language processor 104 may compare the access frequency of an audio file 116 to an access frequency threshold 216 to determine whether to increase or decrease the priority level 120 of the audio file 116. In one embodiment, the priority level 120 is increased when the access frequency is greater than an access frequency threshold 216 and the priority level 120 is decreased when the access frequency is less than the access frequency threshold 216.

The purge thresholds 218 are predefined values that are used for determining whether to remove or delete tags 118 from an audio file 116 and/or from memory. For example, the natural language processor 104 may compare the activity level 124 of a tag 118 to a purge threshold 218 to determine whether to remove the tag 118 from an audio file 116. In one embodiment, the tag 118 is removed from the audio file 116 when the activity level 124 of the tag 118 is less than the purge threshold 218.

The priority level thresholds 219 are predefined values that may be used to determine whether to store an audio file 116 into memory after associating one or more tags 118 with the audio file 116. For example, the natural language processor 104 may determine a priority level 120 for an audio file 116 based on the tags 118 associated with the audio file 106. The natural language processor 104 may then compare the determined priority level 120 to a priority level threshold 219 to determine whether save or discard the audio file 116. The priority level threshold 219 is selected to allow the natural language processor 104 to conserve memory resources by discarding audio files 116 associated with a low priority level 120.

The usage frequency threshold 220 are predefined values that are used for determining whether to generate new tags 118. For example, the natural language processor 104 may compare the number of times a concept occurs within an audio file 116 or a set of audio files 116 to the usage frequency threshold 220 to determine whether to generate a new tag 118 (e.g. an AI-defined tag 224). In one embodiment, an AI-defined tag 224 is generated and stored when the number of times a concept occurs exceeds a usage frequency threshold 220.

The user-defined tags 222, the AI-defined tags 224, and the context tags 226 are similar to the user-defined tags, the AI-defined tags, and the context tags described in FIG. 1, respectively. The audio files 116 may be configured similar to the audio files 116 previously described in FIG. 1.

The network interface 206 is configured to enable wired and/or wireless communications. The network interface 206 is configured to communicate data through a natural language processing system 100 and/or any other system or domain. For example, the network interface 206 may be configured for communication with data sources 102, data storage devices 106, a modem, a switch, a router, a bridge, a server, or a client. The processor 202 is configured to send and receive data using the network interface 206. The network interface 206 may be configured to any suitable type of communication protocol as would be appreciated by one of ordinary skill in the art.

Dynamic Tag Generation

FIG. 3 is a flowchart of an embodiment of an artificial intelligence tagging method 300 for the natural language processing system 100. In one embodiment, method 300 may be employed by the AI engine 108 to generate new AI-defined tags 224 based on concepts observed within a set of audio files 116.

At step 302, the AI engine 108 receives a set of audio files 116. In one embodiment, the AI engine 108 accesses one or more data sources 102 to download audio files 116 from the data sources 102. In another embodiment, the AI engine 108 may receive audio files 116 in response to a request sent to a data source 102. In another embodiment, the AI engine 108 may periodically receive audio files 116 from one or more data sources 102. In this example, the AI engine 108 may receive audio files 116 at any suitable time interval. For example, the AI engine 108 may receive audio files 116 every 5 minutes, every 30 minutes, hourly, every day, or at any other suitable time interval.

At step 304, the AI engine 108 identifies concepts within the set of audio files 116. The AI engine 108 may perform any suitable type of signal processing or natural language processing techniques for identify concepts within an audio file. For instance, the AI engine 108 may perform topic segmentation and recognition to identify concepts from within an audio file 116. As an example, the AI engine 108 may process a set of audio files 116 that comprise recordings of users calling technical support reporting issues with an online service. In this example, the AI engine 108 may identify concepts such as "online services," "errors," and "technical support."

At step 306, the AI engine 108 generates a set of tags 118 based on the identified concepts. In one embodiment, the AI engine 108 may count the number of times a concept occurs within a set of audio files 116 and generate an AI-defined tag 224 when the number of times the concept occurs exceeds a usage frequency threshold 220. Continuing with the previous example, the AI engine 108 may count the number of times that the concepts "online services" and "errors" have occurred and compare the number of time these concepts have occurred to a usage frequency threshold 220. When the number of times these concepts has occurred exceeds the usage frequency threshold 220, the AI engine 108 will generate a new tag 118 that identifies these concepts. For example, the AI engine 108 may generate an AI-defined tag 224 for "system error" or "online services error." In this example, an issue may be a new issue that was not previously known and the AI engine 108 enables the natural language processing system 100 to generate tags 118 to identify and track the new issue. The AI engine 108 provides a technological improvement by listening to audio files 116 to identify new concepts that frequently occur within a set of audio files 116. This functionality allows the natural language processor 104 to learn and identify new concepts for tagging that may not have been previously identified.

At step 308, the AI engine 108 set a priority level 120 for each tag 118. For example, the AI engine 108 assigns tags 118 priority levels 120 to indicate a level of importance or urgency to the system. For example, tags 118 related to errors or time sensitive concepts may be assigned a high priority level 120 (e.g. a larger numeric value). Tags 118 related to general concepts or non-time sensitive concepts may be assigned a lower priority (e.g. a smaller numeric value). In some embodiments, step 308 may be optional and may be omitted. Execution terminates at step 310.

Dynamic Audio File Tagging and Storing

FIG. 4 is a flowchart of an embodiment of an audio sample tagging method 400 for the natural language processing system 100. In one embodiment, method 400 may be implemented by the tagging engine 110 to link tags with an audio file 116 based on concepts that are identified within the audio file 116. Method 400 provides a technical improvement that enables a computer network to tag an audio file 116 based on the content of the audio file 116 which allows the computer network to determine how to handle the audio file 116 to efficiently utilize available hardware resources. This eliminates bottlenecks in the speed and performance of the system.

At step 402, the tagging engine 110 receives an audio file 116. In one embodiment, the tagging engine 110 accesses a data source 102 to download the audio files 116. In another embodiment, the tagging engine 110 receives an audio file 116 in response to sending a request to a data source 102. In another embodiment, the tagging engine 110 may periodically receive an audio file 116 from one or more data sources 102. In this example, the tagging engine 110 may receive audio files 116 at any suitable time interval.

At step 404, the tagging engine 110 identifies observed concepts within the audio file 116. The tagging engine 110 may perform any suitable type of signal processing or natural language processing techniques to identify concepts within an audio file 116. For instance, the tagging engine 110 may perform topic segmentation and recognition to identify concepts from within an audio file 116.

At step 406, the tagging engine 110 determines whether any of the observed concepts match user-defined concepts. The tagging engine 110 compares the identified concepts from the audio file 116 with the concepts linked with the stored user-defined tags 222 to determine whether any of the user-defined concepts are present in the audio file 116. The tagging engine 110 proceeds to step 408 in response to determining that at least one of the observed concepts matches a user-defined concept. Otherwise, the tagging engine 110 proceeds to step 410 in response to determining that none of the observed concepts match the user-defined concepts.

At step 408, the tagging engine 110 associates user-defined tags 222 with the audio file 116. The tagging engine 110 links user-defined tags 222 with the audio file 116 in response to determining that concepts associated with the user-defined tags 222 are present in the audio file 116. In one embodiment, the tagging engine 110 associates the user-defined tags 222 with the audio file 116 by modifying the metadata of the audio file 116 to include the user-defined tags 222.

Returning to step 406, the tagging engine 110 proceeds to step 410 in response to determining that none of the observed concepts match a user-defined concept. At step 410, the tagging engine 110 determines whether any of the observed concepts match AI-defined concepts. The tagging engine 110 compares the identified concepts from the audio file 116 with the concepts linked with the stored AI-defined tags 224 to determine whether any of the AI-defined concepts are present in the audio file 116. The tagging engine 110 proceeds to step 412 in response to determining that at least one of the observed concepts matches an AI-defined concept. Otherwise, the tagging engine 110 proceeds to step 414 in response to determining that none of the observed concepts match the AI-defined concepts.

At step 412, the tagging engine 110 associates AI-defined tags 224 with the audio file 116. The tagging engine 110 links the AI-defined tags 224 with the audio file 116 in response to determining that concepts associated with the AI-defined tags 224 are present in the audio file 116. In one embodiment, the tagging engine 110 associates the AI-defined tags 224 with the audio file 116 by modifying the metadata of the audio file 116 to include the AI-defined tags 224.

Returning to step 410, the tagging engine 110 proceeds to step 414 in response to determining that none of the observed concepts match the AI-defined concepts. At step 414, the tagging engine 110 determines whether any context information is available. The tagging engine 110 may perform any suitable type of signal processing or natural language processing techniques for identify context information within an audio file 116. For instance, the tagging engine 110 may perform speech pattern recognition or noise recognition to identify context information from within an audio file 116. The tagging engine 110 proceeds to step 416 in response to determining that context information is available. Otherwise, the tagging engine 110 proceeds to step 418 in response to determining that context information in unavailable.

At step 416, the tagging engine 110 associates context tags 226 with the audio file 116 based on the identified context information. The tagging engine 110 links the context tags 226 with the audio file 116 in response to determining that context information associated with the context tags 226 is present in the audio file 116. In one embodiment, the tagging engine 110 associates the context tags 226 with the audio file 116 by modifying the metadata of the audio file 116 to include the context tags 226.

Returning to step 414, the tagging engine 110 proceeds to step 418 in response to determining that context information in unavailable. At step 418, the tagging engine 110 determines whether any tags 118 are associated with the audio file 116. For example, the tagging engine 110 may analyze the metadata of the audio file 116 to determine whether the audio file 116 was linked with any user-defined tags 222, AI-defined tags 224, context tags 226, or any other type of tags 118. The tagging engine 110 proceeds to step 420 in response to determining that one or more tags 118 are associated with the audio file 116. Otherwise, the tagging engine 110 proceeds to step 428 in response to determining that the audio file 116 is not associated with any tags 118.

At step 420, the tagging engine 110 determines a priority level 120 for the audio file 116 based on the tags 118 associated with the audio file 116. For example, the tagging engine 110 may assign the audio file 116 with a relatively large numeric value to indicate that an audio file 116 has a high priority or is urgent. For instance, the tagging engine 110 may assign a high priority level 120 when the audio file 116 comprises tags 118 indicating the audio file 116 is related to a system outage or an emergency. The tagging engine 110 may assign the audio file 116 with a smaller numeric value may indicate that an audio file 116 has a low priority or is not urgent. For instance, the tagging engine 110 may assign a low priority level 120 when the audio file 116 comprises tags indicating the audio file 116 is a generic conversation.

At step 422, the tagging engine 110 determines whether the determined priority level 120 is greater than a priority level threshold 219. The tagging engine 110 compares the determined priority level 120 to the priority level threshold 219 to determine whether the priority level 120 of the audio file 116 is greater than the priority level threshold 219. The tagging engine 110 proceeds to step 424 in response to determining that the determined priority level 120 is greater than the priority level threshold 219. Otherwise, the tagging engine 110 proceeds to step 428.

At step 424, the tagging engine 110 determines an activity level 124 for the audio file 116. The tagging engine 110 determines how often the audio file 116 has been accessed within a predetermined time period and determines an activity level 124 for the audio file 116 based on how often the audio file 116 has been accessed.

At step 426, the tagging engine 110 stores the audio file 116 with the modified metadata into memory. For example, the tagging engine 110 may send the audio file 116 with the modified metadata to a data storage device 106. In one embodiment, the tagging engine 110 may be configured to modify the metadata of an audio file 116 to include the priority level 120 and/or the activity level 124 associated with the audio file 116 prior to sending the audio file 116 to the data storage device 106.

In one embodiment, the tagging engine 110 may segment or parse the audio file 116 and may only store a portion of the audio file 116 to reduce the amount of memory used for storing the audio file 116. For example, the tagging engine 110 may use natural language processing operations to segment the audio file 116 into smaller audio file 116 that contains the content previously identified and tagged by the tagging engine 110. This configuration allows the tagging engine 110 to conserve memory by storing smaller audio files 116 that contains the content identified by the tagging engine 110.

In one embodiment, the tagging engine 110 may be configured to additionally or alternatively store a text translation or representation of the audio file 116. This configuration allows the tagging engine 110 to conserve memory by storing the audio file 116 as a text file which is a smaller size file and consumes less memory than a traditional audio file 116.

Returning to step 418, the tagging engine 110 proceeds to step 428 in response to determining that the audio file is not associated with any tags 118. At step 428, the tagging engine 110 deletes the audio file. This configuration allows the natural language processing system 100 to conserve memory by deleting audio files 116 that are determined to not be important or useful to the natural language processing system 100. Execution of method 400 terminates at step 430.

Selective Data Storing Based on Tags

FIG. 5 is a flowchart of an embodiment of a selective audio sample storing method 500 for the natural language processing system 100. In one embodiment, method 500 is implemented by the resource allocation engine 114 to identify a storage location (i.e. a storage device 106) for an audio file 116 based on the tags 118 linked with the audio file 116. Method 500 provides technical improvements over other systems by providing the ability to selectively determine where to store audio files 116 based on the content within an audio file 116. For example, method 500 allows the computer network to select a data storage device 106 and/or location for an audio file 116 based on information extracted from the audio file 116 such as requirements for data access speed and security.

At step 502, the resource allocation engine 114 receives an audio file 116. In one embodiment, the resource allocation engine 114 accesses a data source 102 to download the audio files 116. In another embodiment, the resource allocation engine 114 receives the audio file 116 in response to sending a request to a data source 102. In another embodiment, the resource allocation engine 114 may periodically receive an audio file 116 from one or more data sources 102. In this example, the resource allocation engine 114 may receive audio files 116 at any suitable time interval.

At step 504, the resource allocation engine 114 identifies observed concepts within the audio file 116. The resource allocation engine 114 may perform any suitable type of signal processing or natural language processing techniques for identify concepts within an audio file 116. For instance, the resource allocation engine 114 may perform topic segmentation and recognition to identify concepts from within an audio file 116.

At step 506, the resource allocation engine 114 determines whether any of the observed concepts match user-defined concepts. The resource allocation engine 114 compares the identified concepts from the audio file 116 with the concepts linked with the stored user-defined tags 222 to determine whether any of the user-defined concepts are present in the audio file 116. The resource allocation engine 114 proceeds to step 508 in response to determining that at least one of the observed concepts matches a user-defined concept. Otherwise, the resource allocation engine 114 proceeds to step 510 in response to determining that none of the observed concepts match the user-defined concepts.

At step 508, the resource allocation engine 114 associates user-defined tags 222 with the audio file 116. The resource allocation engine 114 links user-defined tags 222 with the audio file 116 in response to determining that concepts associated with the user-defined tags 222 are present in the audio file 116. In one embodiment, the resource allocation engine 114 associates the user-defined tags 222 with the audio file 116 by modifying the metadata of the audio file 116 to include the user-defined tags 222.

Returning to step 506, the resource allocation engine 114 proceeds to step 510 in response to determining that none of the observed concepts match a user-defined concept. At step 510, the resource allocation engine 114 determines whether any of the observed concepts match AI-defined concepts. The resource allocation engine 114 compares the identified concepts from the audio file 116 with the concepts linked with the stored AI-defined tags 224 to determine whether any of the AI-defined concepts are present in the audio file 116. The resource allocation engine 114 proceeds to step 512 in response to determining that at least one of the observed concepts matches an AI-defined concept. Otherwise, the resource allocation engine 114 proceeds to step 514 in response to determining that none of the observed concepts match the AI-defined concepts.

At step 512, the resource allocation engine 114 associates AI-defined tags 224 with the audio file 116. The resource allocation engine 114 links the AI-defined tags 224 with the audio file 116 in response to determining that concepts associated with the AI-defined tags 224 are present in the audio file 116. In one embodiment, the resource allocation engine 114 associates the AI-defined tags 224 with the audio file 116 by modifying the metadata of the audio file 116 to include the AI-defined tags 224.

Returning to step 510, the resource allocation engine 114 proceeds to step 514 in response to determining that none of the observed concepts match the AI-defined concepts. At step 514, the resource allocation engine 114 determines whether any context information is available. The resource allocation engine 114 may perform any suitable type of signal processing or natural language processing techniques for identify context information within an audio file 116. For instance, the resource allocation engine 114 may perform speech pattern recognition or noise recognition to identify context information from within an audio file 116. The resource allocation engine 114 proceeds to step 516 in response to determining that context information is available. Otherwise, the resource allocation engine 114 proceeds to step 518 in response to determining that context information in unavailable.

At step 516, the resource allocation engine 114 associates context tags 226 with the audio file 116 based on the identified context information. The resource allocation engine 114 links the context tags 226 with the audio file 116 in response to determining that context information associated with the context tags 226 is present in the audio file 116. In one embodiment, the resource allocation engine 114 associates the context tags 226 with the audio file 116 by modifying the metadata of the audio file 116 to include the context tags 226.

Returning to step 514, the resource allocation engine 114 proceeds to step 518 in response to determining that context information in unavailable. At step 518, the resource allocation engine 114 determines whether any tags 118 are associated with the audio file 116. For example, the resource allocation engine 114 may analyze the metadata of the audio file 116 to determine whether the audio file 116 was linked with any user-defined tags 222, AI-defined tags 224, context tags 226, or any other type of tags 118. The resource allocation engine 114 proceeds to step 520 in response to determining that one or more tags 118 are associated with the audio file 116. Otherwise, the resource allocation engine 114 proceeds to step 528 in response to determining that the audio file 116 is not associated with any tags 118.

At step 520, the resource allocation engine 114 determines a priority level 120 based on the tags 118 associated with the audio file 116. For example, the resource allocation engine 114 may assign the audio file 116 with a relatively large numeric value to indicate that an audio file 116 has a high priority or is urgent. The resource allocation engine 114 may assign the audio file 116 with a smaller numeric value may indicate that an audio file 116 has a low priority or is not urgent.

At step 522, the resource allocation engine 114 determines an activity level 124 for the audio file 116. The resource allocation engine 114 determines how often the audio file 116 has been access within a predetermined time period and determines an activity level 124 for the audio file 116 based on how often the audio file 116 has been accessed.

At step 524, the resource allocation engine 114 determines a storage location for the audio file 116. The resource allocation engine 114 selects a storage device 106 for the audio file 116 based on the tags 118 associated with the audio file 116 and/or storage requirements for the audio file 116. In one embodiment, tags 118 may be associated with particular storage devices 106 or locations. For instance, a storage device 106 in a technical support server or location may be selected for tags 118 associated with system errors or issues. As another example, a storage device 106 in a fraud detection center may be selected for tags 118 associated with fraud. In another embodiment, the resource allocation engine 114 determines storage requirements for the audio file 116 based on tags 118 associated with the audio file 116. Examples of storage requirements include, but are not limited to, priority levels 120, activity levels 124, data access speeds, security requirements, accessibility, or any other suitable type of requirements. This configuration allows the resource management engine 114 to manage the utilization of storage devices 106 for storing audio files 116 by routing audio files 116 to storage devices 106 where they are needed and can be quickly accessed.

The resource allocation engine 114 may determine a data access speed for the audio file 116 based on the tags 118 associated with the audio file 116 and select a storage location for the audio file 116 based on the determined data access speed. For example, an audio file 116 that is associated with a fast data access speed may be sent to a storage device 106 that allows fast data access such as a flash memory drive. As another example, an audio file 116 that is associated with a slow data access speed may be sent to a storage device 106 with a slower data access speed such as a tape drive. This configuration allows the resource allocation engine 114 to more efficiently manage the utilization of storage devices 106 for storing audio files 116. Slower storage devices 106 may be more readily available but may offer lower data access speeds. Conversely, faster storage devices 106 may provide higher data access speed but their availability may be limited due to costs.

The resource allocation engine 114 may determine a priority level 120 for an audio file 116 based on the tags 118 associated with the audio file 116 and select a storage location for the audio file 116 based on the determined priority level 120. For example, an audio file 116 that is associated with a high priority level 120 may be sent to a storage device 106 that allows fast data access speeds, enhanced security, and/or any other features for high priority audio files 116. This allows audio files 116 to be quickly accessed and reviewed. As another example, an audio file 116 that is associated with a lower priority level 120 may be sent to a storage device 106 with slower data access speed, basic security, and/or any other features for low priority audio files 116. This configuration allows the resource allocation engine 114 to efficiently manage the utilization of storage devices 106 for storing audio files 116. Storage devices 106 with levels of data access speed, security features, and other features can be dynamically selected for audio files 116 based on their priority level 120.

In other embodiments, the resource allocation engine 114 may select a storage device 106 for the audio file 116 based on any other suitable information or combination of information associated with the audio file 116.

At step 526, the resource allocation engine 114 sends the audio file 116 to the selected storage location. The resource allocation engine 114 may send the audio file 116 to the selected storage device 106 using any suitable communication protocol or technique as would be appreciated by one of ordinary skill in the art.

In one embodiment, the resource allocation engine 114 may segment or parse the audio file 116 and may only send a portion of the audio file 116 to reduce the amount of memory used for storing the audio file 116. For example, the resource allocation engine 114 may use natural language processing operations to segment the audio file 116 into smaller audio file 116 that contains the content previously identified and tagged by the resource allocation engine 114. This configuration allows the resource allocation engine 114 to conserve memory by storing smaller audio files 116 that contains the content identified by the tagging engine 110.

In one embodiment, the resource allocation engine 114 may be configured to additionally or alternatively send a text translation or representation of the audio file 116. This configuration allows the resource allocation engine 114 to conserve memory by storing the audio file 116 as a text file which is a smaller size file and consumes less memory than a traditional audio file 116.

Returning to step 518, the resource allocation engine 114 proceeds to step 528 in response to determining that the audio file is not associated with any tags 118. At step 528, the resource allocation engine 114 deletes the audio file 116. This configuration allows the natural language processing system 100 to conserve memory by deleting audio files 116 that are determined to not be important or useful to the natural language processing system 100. Execution of method 500 terminates at step 530.

In an alternative embodiment, one or more steps (e.g. steps 502-516) of method 500 may be implemented by the tagging engine 110. For example, the tagging engine 110 may be employed to process an audio file 116 and to link the audio file 116 with tags 118 using a process similar to the process described in FIG. 4.

Tag Usage Management

FIG. 6 is a flowchart of an embodiment of a tag management method 600 for the natural language processing system 100. In one embodiment, method 600 is implemented by the tag management engine 112 to periodically remove tags 118 that are not being used frequently. Method 600 allows the natural language processing system 100 to dynamically reduce file sizes and free up memory resources by removing tags 118 from memory that are not being frequently used.

At step 602, the tag management engine 112 receives an audio file 116. In one embodiment, the tag management engine 112 accesses a data source 102 to download the audio files 116. In another embodiment, the tag management engine 112 may receive an audio file 116 in response to a request to a data source 102. In another embodiment, the tag management engine 112 may periodically receive an audio file 116 from one or more data sources 102. In this example, the tag management engine 112 may receive audio files 116 at any suitable time interval.

At step 604, the tag management engine 112 identifies tags 118 linked with the audio file 116. For example, the tag management engine 112 may analyze the metadata of the audio file 116 to identify user-defined tags 222, AI-defined tags 224, and context tags 226 linked with the audio file 116.

At step 606, the tag management engine 112 determines an access frequency for the audio file 116 within a predetermined time period. The tag management engine 112 determines how often the audio file 116 has been access within the predetermined time period and uses the number of times that the audio file 116 has been access as the access frequency. For example, the tag management engine 112 may determine the access frequency based on the number of access timestamps 122 within the predetermined time period.

At step 608, the tag management engine 112 determines whether the access frequency is greater an access frequency threshold 216. The tag management engine 112 compares the determined access frequency to the access frequency threshold 216 to determine whether the access frequency is greater than the access frequency threshold value 216. The tag management engine 112 proceeds to step 610 in response to determining that the access frequency is above the access frequency threshold 216. Otherwise, the tag management engine 112 proceeds to step 612 in response to determining that the access frequency is less than the access frequency threshold 216.

At step 610, the tag management engine 112 increase the activity level 124 for the identified tags 118 in response to determining that access frequency is greater than the access frequency threshold 216. For example, the tag management engine 112 may increment or increase the numeric value representing the activity level 124 of a tag 118. In one embodiment, the tag management engine 112 modifies the metadata of the audio file 116 to reflect the new activity level 124 of the tag 118.

At step 612, the tag management engine 112 reduces the activity level 124 for the identified tags 118 in response to determining that access frequency is less than the access frequency threshold 216. For example, the tag management engine 112 may decrement or decrease the numeric value representing the activity level 124 of a tag 118. In one embodiment, the tag management engine 112 modifies the metadata of the audio file 116 to reflect the new activity level 124 of the tag 118.

At step 614, the tag management engine 112 determines whether the activity level 124 of any of the tags 118 is below a purge threshold 218. The tag management engine 112 compares the activity levels 124 of the tags 118 to the purge threshold 218 to determine whether the activity level 124 of any of the tags 118 is less than the purge threshold value 218. The tag management engine 112 proceeds to step 616 in response to determining that the activity level 124 of one or more tags 118 is below the purge threshold 218. Otherwise, the tag management engine 112 terminates method 600.

At step 616, the tag management engine 112 deletes or removes tags 118 with an activity level 124 below the purge threshold 218. This configuration allows the tag management engine 112 to dynamically reduce file sizes and free up memory resources by removing tags 118 that are not being frequently used. Execution of method 600 terminates at step 618.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A natural language processing system, comprising:
one or more data storage devices;
a network interface in signal communication with the one or more data storage devices and one or more data sources, wherein the network interface is configured to receive audio files from the one or more data sources;
a memory operable to store artificial intelligence (AI)-defined tags linked with a first set of concepts;
an AI engine implemented by a processor operably coupled to the network interface and the memory, configured to:
receive a set of audio files;
identify concepts within the set of audio files;
determine a usage frequency for each of the identified concepts, wherein the usage frequency indicates how often each of the identified concepts occurs within the set of audio files;
compare the usage frequency for each identified concept to a usage frequency threshold; and
generate an AI-defined tag for each identified concept with a usage frequency that is greater than the usage frequency threshold, wherein each AI-defined tag is linked with the corresponding identified concept; and
a tagging engine implemented by the processor, configured to:
receive an audio file;
identify observed concepts within the audio file;
compare the observed concepts to the first set of concepts; and
determine that one or more observed concepts matches concepts within the first set of concepts; and modify metadata for the audio file to include AI-defined tags linked with the concepts from the first set of concepts that match the observed concepts;
determine a priority level for the audio file based at least in part upon the AI-defined tags associated with the audio file, wherein:
the priority level indicates an urgency in addressing the one or more observed concepts; and
if the one or more observed concepts comprise at least a system outage, the priority level for the audio file is determined to be high; wherein the tagging engine is further configured to:
compare the determined priority level to a priority level threshold;
identify, based at least in part upon the determined priority level of the audio file, a storage location that allows storage requirements of the audio file, wherein storage requirements of audio files having priority levels above the priority level threshold comprise one or more of fast data access speeds and enhanced security;
if it is determined that the determined priority level is greater than the priority level threshold, send the audio file to a first storage location that allows the storage requirements of audio files having priority levels above the priority level threshold; and if it is determined that the determined priority level is less than the priority level threshold, send the audio file to a second storage location having slow data access speeds and basic security.

2. The system of claim 1, wherein the tagging engine is further configured to delete the audio file in response to determining that the determined priority level is less than the priority level threshold.

3. The system of claim 1, wherein the tagging engine is further configured to modify the metadata for the audio file to include the determined priority level for the audio file.

4. The system of claim 1, wherein the tagging engine is further configured to:
determine how often the audio file has been accessed within a predetermined time period;
determine an activity level for the audio file based on how often the audio file has been accessed within the predetermined time period, wherein the activity level is a value that decays over time; and
modify the metadata for the audio file to include the activity level for the audio file.

5. The system of claim 1, wherein:
the memory is operable to store user-defined tags linked with a second set of concepts; and
the tagging engine is further configured to:
compare the observed concepts to second set of concepts;
determine that one or more observed concepts matches concepts within the second set of concepts; and
modify the metadata for the audio file to include user-defined tags linked with the concepts from the second set of concepts that match the observed concepts.

6. The system of claim 1, wherein:
the memory is operable to store context tags linked with a set of context identifiers, wherein a context identifier identifies non-verbal audio information from the set of audio files; and
the tagging engine is further configured to:
identify observed context identifiers from the audio file;
determine that one or more observed context identifiers matches context identifiers within the set of context identifiers; and
modify the metadata of the audio file to include context tags linked with the context identifiers from the set of context identifiers that match the observed context identifiers.

7. A natural language processing method, comprising:
receiving, by an artificial intelligence (AI) engine implemented by a processor, a set of audio files;
identifying, by the AI engine, concepts within the set of audio files;
determining, by the AI engine, a usage frequency for each of the identified concepts, wherein the usage frequency indicates how often each of the identified concepts occurs within the set of audio files;
comparing, by the AI engine, the usage frequency for each identified concept to a usage frequency threshold;
generating, by the AI engine, an AI-defined tag for each identified concept with a usage frequency that is greater than the usage frequency threshold, wherein each AI-defined tag is linked a concept from a first set of concepts;
receiving, by a tagging engine implemented by the processor, an audio file;
identifying, by the tagging engine, observed concepts within the audio file;
comparing, by the tagging engine, the observed concepts to the first set of concepts;
determining, by the tagging engine, that one or more observed concepts matches concepts within the first set of concepts; and
modifying, by the tagging engine, metadata for the audio file to include AI-defined tags linked with the concepts from the first set of concepts that match the observed concepts
determine a priority level for the audio file based at least in part upon the AI-defined tags associated with the audio file, wherein:
the priority level indicates an urgency in addressing the one or more observed concepts; and
if the one or more observed concepts comprise at least a system outage, the priority level for the audio file is determined to be high; wherein the tagging engine is further configured to:
compare the determined priority level to a priority level threshold;
identify, based at least in part upon the determined priority level of the audio file, a storage location that allows storage requirements of the audio file, wherein storage requirements of audio files having priority levels above the priority level threshold comprise one or more of fast data access speeds and enhanced security;
if it is determined that the determined priority level is greater than the priority level threshold, send the audio file to a first storage location that allows the storage requirements of audio files having priority levels above the priority level threshold; and
if it is determined that the determined priority level is less than the priority level threshold, send the audio file to a second storage location having slow data access speeds and basic security.

8. The method of claim 7, further comprising:
deleting, by the tagging engine, the audio file in response to determining that the determined priority level is less than the priority level threshold.

9. The method of claim 7, further comprising modifying, by the tagging engine, the metadata for the audio file to include the determined priority level for the audio file.

10. The method of claim 7, further comprising:
determining, by the tagging engine, how often the audio file has been accessed within a predetermined time period;
determining, by the tagging engine, an activity level for the audio file based on how often the audio file has been accessed within the predetermined time period, wherein the activity level is a value that decays over time; and
modifying, by the tagging engine, the metadata for the audio file to include the activity level for the audio file.

11. The method of claim 7, further comprising:
comparing, by the tagging engine, the observed concepts to a second set of concepts, wherein the second set of concepts is linked with a set of user-defined tags;
determining, by the tagging engine, that one or more observed concepts matches concepts within the second set of concepts; and
modifying, by the tagging engine, the metadata for the audio file to include user-defined tags linked with the concepts from the second set of concepts that match the observed concepts.

12. The method of claim 7, further comprising:
identifying, by the tagging engine, observed context identifiers from the audio file;
determining, by the tagging engine, that one or more observed context identifiers matches context identifiers within a set of context identifiers, wherein a context identifier identifies non-verbal audio information, and wherein the set of context identifiers is linked with a set of context tags; and
modifying, by the tagging engine, the metadata of the audio file to include context tags linked with the context identifiers from the set of context identifiers that match the observed context identifiers.

13. A natural language processing device, comprising:
a memory operable to store artificial intelligence (AI)-defined tags linked with a first set of concepts;
an AI engine implemented by a processor operably coupled to the memory, configured to:
 access a set of audio files;
 identify concepts within the set of audio files;
 determine a usage frequency for each of the identified concepts, wherein the usage frequency indicates how often each of the identified concepts occurs within the set of audio files;
 compare the usage frequency for each identified concept to a usage frequency threshold; and
 generate an AI-defined tag for each identified concept with a usage frequency that is greater than the usage frequency threshold, wherein each AI-defined tag is linked with the corresponding identified concept; and
a tagging engine implemented by the processor, configured to:
 receive an audio file;
 identify observed concepts within the audio file;
 compare the observed concepts to the first set of concepts;
 determine that one or more observed concepts matches concepts within the first set of concepts; and
 modify metadata for the audio file to include AI-defined tags linked with the concepts from the first set of concepts that match the observed concepts;
 determine a priority level for the audio file based at least in part upon the AI-defined tags associated with the audio file, wherein:
  the priority level indicates an urgency in addressing the one or more observed concepts; and
  if the one or more observed concepts comprise at least a system outage, the priority level for the audio file is determined to be high; wherein the tagging engine is further configured to:
 compare the determined priority level to a priority level threshold;
 identify, based at least in part upon the determined priority level of the audio file, a storage location that allows storage requirements of the audio file, wherein storage requirements of audio files having priority levels above the priority level threshold comprise one or more of fast data access speeds and enhanced security;
 if it is determined that the determined priority level is greater than the priority level threshold, send the audio file to a first storage location that allows the storage requirements of audio files having priority levels above the priority level threshold; and
 if it is determined that the determined priority level is less than the priority level threshold, send the audio file to a second storage location having slow data access speeds and basic security.

14. The device of claim 13, wherein the tagging engine is further configured to delete the audio file in response to determining that the determined priority level is less than the priority level threshold.

15. The device of claim 13, wherein the tagging engine is further configured to modify the metadata for the audio file to include the determined priority level for the audio file.

16. The device of claim 13, wherein the tagging engine is further configured to:
determine how often the audio file has been accessed within a predetermined time period;
determine an activity level for the audio file based on how often the audio file has been accessed within the predetermined time period, wherein the activity level is a value that decays over time; and
modify the metadata for the audio file to include the activity level for the audio file.

17. The device of claim 13, wherein:
the memory is operable to store context tags linked with a set of context identifiers, wherein a context identifier identifies non-verbal audio information from the set of audio files;
the tagging engine is further configured to:
 identify observed context identifiers from the audio file;
 determine that one or more observed context identifiers matches context identifiers within the set of context identifiers; and
 modify the metadata of the audio file to include context tags linked with the context identifiers from the set of context identifiers that match the observed context identifiers.

* * * * *